United States Patent [19]

Hodson

[11] 4,111,067

[45] Sep. 5, 1978

[54] RUPTURABLE FLYWHEEL ENERGY SYSTEM

[75] Inventor: Donald R. Hodson, Thousand Oaks, Calif.

[73] Assignee: Rockwell International Corporation, El Segundo, Calif.

[21] Appl. No.: 758,103

[22] Filed: Jan. 10, 1977

[51] Int. Cl.² ............... G05G 1/00; F16F 15/30
[52] U.S. Cl. ............................... 74/572; 310/74; 74/5.6 D
[58] Field of Search ............. 74/572, 573, 573 F, 74/5 R, 5.6 D; 310/74, 261, 262, 271

[56] References Cited

U.S. PATENT DOCUMENTS

| 928,544 | 7/1909 | Scaramuzza | 74/572 |
| 3,662,619 | 5/1972 | Seeliger | 74/572 |
| 3,960,034 | 6/1976 | Hintergraber | 74/572 X |

FOREIGN PATENT DOCUMENTS

| 975,009 | 2/1951 | France | 310/74 |
| 2,502,613 | 7/1976 | Fed. Rep. of Germany | 74/572 |
| 613,427 | 4/1935 | Fed. Rep. of Germany | 74/572 |

Primary Examiner—Samuel Scott
Assistant Examiner—Don E. Ferrell
Attorney, Agent, or Firm—L. Lee Humphries; Robert G. Upton

[57] ABSTRACT

The flywheel configuration results in optimum balance of wheel mass in the form of a proportioned disk whose cross-section necks down towards its outer extremity forming a highly stressed region, then expands to form a thin cylindrical breakaway rim portion having a large flat outer peripheral surface, the rim providing optimum inertia for the flywheel. The energy system further consists of a barrier ring to prevent overspeed of the flywheel and contains rim fragments in the event of catastrophic separation of the rim from the disk.

2 Claims, 5 Drawing Figures

RUPTURABLE FLYWHEEL ENERGY SYSTEM

The invention herein described was made in the course of or under a contract or subcontract thereunder, (or grant) with the U.S. Army.

BACKGROUND OF THE INVENTION

1. Field of the Invention

This invention relates to a flywheel disk having a cylindrical rim portion designed to separate from the disk in the event of flywheel overspeed and a flywheel barrier device to control overspeed and retain fragmented rim particles from a partially failed flywheel.

2. Description of the Prior Art

Flywheel energy devices have been known for thousands of years; however, recent developments in the state of the art have resulted in increased efficiency[1] wherein better configurations and better materials are utilized in flywheel fabrication so that higher rotational speeds are possible. As larger, faster flywheels are built more energy is stored in the flywheel resulting in more destructive forces generated if the wheel should fail. Consequently, massive safety barriers are fabricated to contain this potentially destructive force. The result, of course, is a cumbersome and heavy flywheel energy system not well suited for some power system applications.

[1] where efficiency is defined as stored energy per unit mass or per unit volume.

While flywheel systems are well known in the prior art, no one has developed a simple method to prevent flywheel overspeeding. Nor, apparently, has anyone attempted to minimize the catastrophic potential of an overstressed overspeeding flywheel.

SUMMARY OF THE INVENTION

This invention describes an apparatus and method to produce a safe, efficient, compact flywheel energy storage system which produces intensive peak delivery. In a flywheel system wherein rotary motion is utilized as a source of energy, the flywheel has a disk portion and an integral rim portion, the disk portion being evenly stressed from its central portion radially outwardly towards a narrowed-down neck portion formed by the disk. The neck portion positioned between the disk, and the integral rim portion is more highly stressed than the disk portion to facilitate separation of the rim portion from the disk portion in the event of flywheel overstress, thereby maintaining the integrity of the disk portion.

The flywheel device employs an optimum balance of an equalized stress disk having a thin cylindrical rim portion forming the outer periphery of the flywheel; the cylindrical rim providing optimum inertia. The configuration is first designed to expand elastically with speed to a controlled limit and being further designed to separate the rim from the massive disk portion at a narrow, most highly-stressed neck section between the disk and the rim to avoid tensile failure of the heavier disk in the event of a catastrophic overstress of the flywheel. The rim is further designed for a large patio of outer surface area to flywheel disk so as to limit penetration of a surrounding safety barrier system. Because the forces can be extremely large, the barrier ring is designed to float within a housing so that momentum transmitted by rotational rim fragment impact can be dissipated through elastic expansion, frictional heating and barrier ring rotational acceleration to avoid fracture of the assembly support structure. The barrier ring is designed to accelerate and expand in the event of flywheel contact so that energy is dissipated by increasing ring thermal and inertial energy.

The general shape of the massive disk portion is proportioned so as to achieve nearly equalized stress throughout the disk body for maximum utilization of inertia.

The flywheel mass is heaviest towards the axis of the wheel and the disk tapers down progressively as it radially extends outwardly to a neck-down portion. If the flywheel should overspeed the more highly stressed neck portion will fail first, throwing off the wide surfaced cylindrical rim portion, thus relieving the load on and preserving the integrity of the heavier disk portion which contains about 90% of the weight of the flywheel. Thus, it can readily be seen that the majority of the flywheel remains intact, thereby minimizing the catastrophic effect resulting from the entire disintegration of the flywheel. Additionally, the large outer peripheral surface provided by the cylindrical rim lends itself ideally to a means to control the speed of the flywheel by utilizing material whose elastic growth is sufficient to cause contact with the surrounding "brake-shoe-like" barrier ring device. Inside of a housing channel is a solid barrier ring nearly concentrically positioned about the channel and the outside surface of the rim portion of the flywheel. The inside surface of barrier ring device is contacted by an overspeeding, radially extended flywheel, thus slowing down the flywheel and thereby preventing catastrophic failure of the flywheel.

The barrier system additionally is supplied with a simple electronic device that monitors the radial growth of the flywheel contained within the barrier system, thus the operator may monitor at all times the condition of the flywheel during operation.

Therefore, it is an object of this invention to provide a flywheel energy system with a specially designed flywheel having a rim portion that is separable from the larger flywheel portion in the event the flywheel is overstressed.

More specifically, it is an object of this invention to provide a flywheel energy system which incorporates a balanced evenly-stressed flywheel having a separable rim portion thus preventing catastrophic destruction of the entire flywheel while providing a barrier system that not only contains the separated rim portion but provides a system whereby overstress of the flywheel is monitored and prevented by the barrier system.

An advantage over the prior art flywheel systems is the ability to control the integrity of a flywheel by so designing the flywheel to separate a portion of an overstressed flywheel, thus resulting in less destructive forces generated.

Yet another advantage over the prior art flywheel systems is the ability to monitor the condition of the flywheel to control potential overspeed by providing a flywheel overspeed control system using the barrier system for braking.

The above-noted objects and advantages of the present invention will be more fully understood upon a study of the following detailed description in conjunction with the detailed drawings.

DESCRIPTION OF THE PREFERRED EMBODIMENTS

Figures 1, 2:
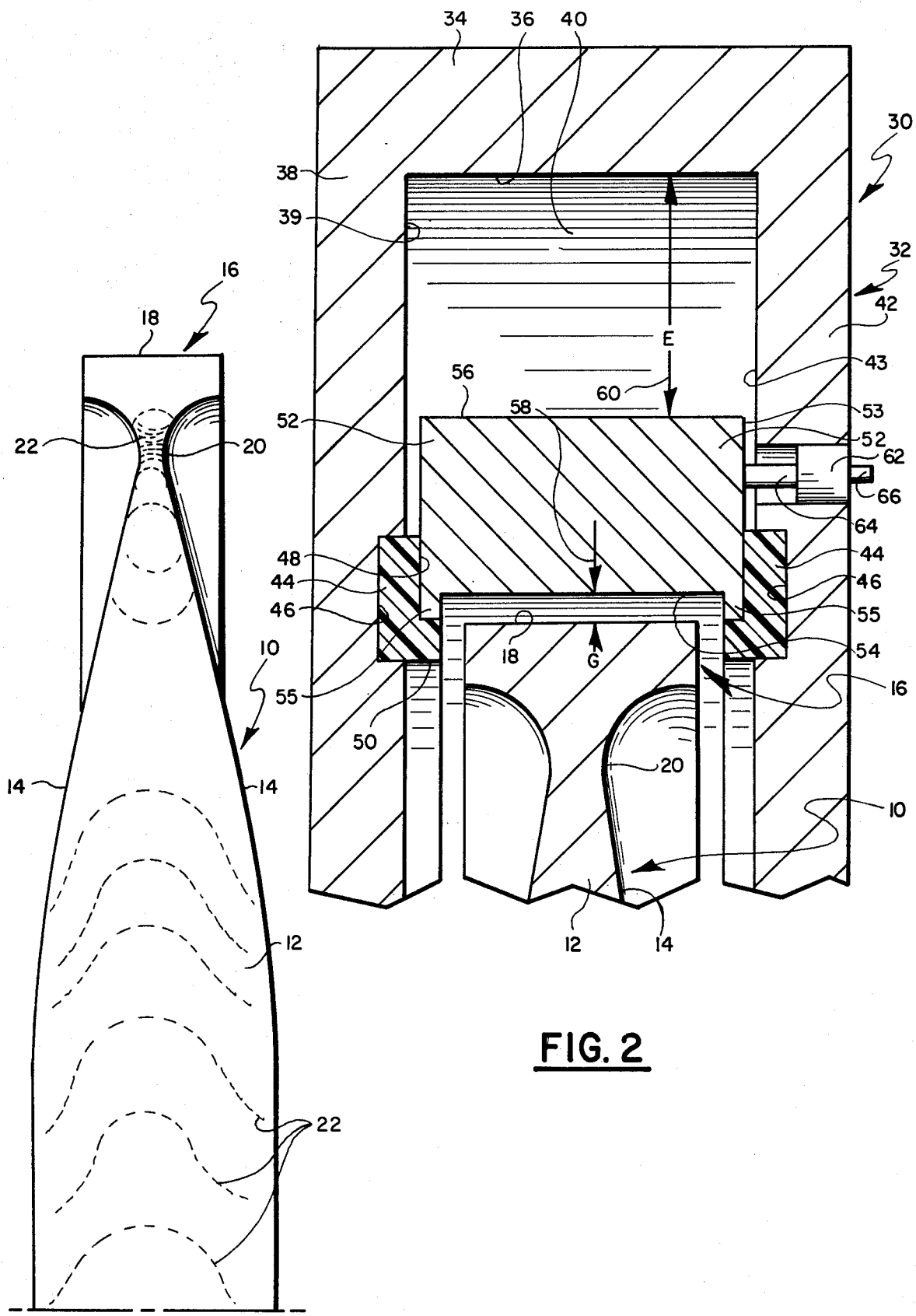
FIG. 1 is a diagrammatic partial cross section of the flywheel configuration indicating stress distribution throughout the flywheel.
FIG. 2 is a partial cross section of a portion of the flywheel disk and rim assembly encased within an outer barrier trough with a barrier ring and guide ring positioned within the trough.

Referring to FIG. 1, the flywheel rotor generally designated as 10 is designed to control the stress profile at any speed of rotation so that the narrow neck portion 20 of the flywheel between the disk 12 and the rim portion generally designated as 16 is more highly stressed than any other region of the flywheel 10. The diagrammatic figure indicates stress contours 22 which are typical of this type of rotor configuration. It can readily be seen that the area with the highest stress is the neck region between the body of the rotor 12 and the rim portion 16.

The rotor material is selected such that elastic deformations in the radial direction as a function of speed are large enough that a practical gap clearance between the peripheral edge 18 of rotor assembly 10 and a barrier ring (to be described later) may be chosen where rotor growth between the 0-speed state and the rated speed state does not result in rim 16/barrier ring (52 of FIG. 2) contact, yet contact can be assured at higher speeds well before the elastic limit of the material is exceeded.

There are various materials that have been used in flywheel fabrication. A preferred material, for example, is a material manufactured by Republic Steel, Canton, Ohio Division, called HP9-4-30 steel having the following ingredients listed in Table I:

| | |
|---|---|
| Nickel | 7.00 to 8.00% |
| Cobalt | 4.25 to 5.00 |
| Chromium | 0.90 to 1.10 |
| Molybdenum | 0.90 to 1.10 |
| Carbon | 0.29 to 0.34 |
| Manganese | 0.10 to 0.35 |
| Vanadium | 0.06 to 0.12 |
| Copper | 0.35 max |
| Silicon | 0.10 max |
| Sulphur | 0.010 max |
| Phosphorus | 0.010 max |

The HP9-4-30 steel has the following physical properties in the preferred rotor assembly per Table II:

TABLE II

| | |
|---|---|
| Tensile Ultimate | 220 KSI |
| Tensile Yield | 190 KSI |
| Elongation | 12% |
| Hardness | 48-58 |
| Fracture Toughness | 90 KSI √in |
| Poissons Ratio | .296 |
| Density | 0.283 lbs/in³ |
| Thermal Conductivity (70-200F) | 170 $\frac{BTU-in}{hr\, ft^2\, °F}$ |
| Electrical Resistivity (at 75° F) | $36.6 \times 10^{-6} \frac{\Omega}{cm}$ |
| Thermal Coefficient of Expansion (70-200F) | $6.4 \times 10^{-6} \frac{in}{in°\, F}$ |

The rotor rim 16 size and shape are chosen to optimize contact surface area (surface 18) without significant bending at the outer face 18 or excess rim mass and stored energy relative to barrier energy absorption capabilities (FIG. 2) yet the rim 16 should be as large as practical in consideration of the greater energy storage efficiency relative to the disk 12. The rotor neck region 20 contour is chosen to achieve clean rim breakaway and balanced unloading of the disk as well as radially vectored rim energy release. Typically, the rim portion 16 comprises about 10 percent of the overall flywheel weight.

Referring now to FIG. 2, the flywheel rotor is housed within a barrier casing or housing generally designated as 30. The barrier housing 32 consists of walls 38 and 42 which form a protective covering for the rotor assembly 10, the housing having an outer peripheral wall 34 forming a barrier trough around the outer peripheral edge of rim 16. Within annulus 40 formed by walls 38, 42 and 34, is contained a barrier ring 52. Barrier ring 52 is allowed to ride within an insulated guide ring 44 which is retained within walls 39 and 43 by a recess portion 46. The guide ring has a lip portion 50 which supports ring 52. The inner surface 55 of barrier ring 52 forms a pair of inwardly extending lip portions 55 which nest within the center portion 50 of insulated guide ring 46. The barrier ring 52 is designed primarily as a braking surface for the intact rotor assembly 10. Secondly, the barrier ring is designed to be freely suspended and electrically insulated from the rotor assembly 10. The reason for which the barrier ring is insulated will be subsequently explained. Another primary purpose for the barrier ring is the means by which rim containment is assured if the rim 16 should separate from the body of the rotor 10. For optimum rotor braking, the barrier ring is preferably positioned in a slightly eccentric circle relative to the rotor rim 16 so that braking will occur in most cases without seizure or damage to the rotor hardware. Where rotor radial growth rate is severe in the case of an overspeeding rotor, the barrier ring 52 should be free to grow and thereby capture the full circumferential inner face of surface 18 of rim 16, contacting the inner face 54 of barrier ring 52 for increased braking surface friction. The shape of the barrier ring 52 and its material elongation properties are chosen to promote encapsulation of the rim 16 of rotor body 12 whether or not the rim separates from the disk 12.

For rim containment, a general relationship controlling ring size is as follows:

$$\left(\frac{m_{br}}{m_{rim}}\right) + \left(\frac{m_{br}}{m_{rim}}\right)^2 = \left(\frac{\rho_{rim} v_{rim}^2}{2g\, \Sigma_{br}\, \tau_{br}}\right) F_s$$

m is mass in lbs
P is density in lbs/in²
v is velocity in in/sec
g is 386 in/sec²
Σ is material elongation fracton
τ is ultimate tensile strength
$F_s$ is factor of safety
br is barrier ring 52

| -continued |
| --- |
| rim is rotor rim 16 |

Detection of flywheel growth is a key requirement to avoid overstress to catastrophic failure. To detect an overstress situation, a provision is provided to sense this development. An electrically conducting terminal 64 positioned through wall 42 of the barrier casting 30, has an insulator 62 and contacts the side wall 53 of barrier ring 52. An electrical lead 66 terminates within rotor detecting instruments remote from the flywheel assembly (not shown). The insulator guide ring 44 supporting the barrier ring 52 allows the ring to be used as one plate of a capacitor with the flywheel rim 16 used as the second plate. The wheel 10 is grounded through a bearing system (not shown) and the barrier ring is connected to an oscillating electrical voltage (not shown). As wheel growth occurs due to thermal or mechanical strain, the plates (rim 16 and barrier ring 52) get closer and the drop across the capacitor plate impedence decreases allowing clearance between surface 18 of rim 16 and inner surface 54 of barrier ring 52 shown as a gap 58 to be measured so that corrective action may be taken before wheel failure occurs. As heretofore stated, containment of total disintegration of a large high energy storage flywheel is very difficult, therefore the wheel and barrier ring design is directed toward promotion of corrective action to avoid complete disintegration rather than containment thereby. Thus, it can readily be seen that the barrier ring clearance 58 is designed to cause rubbing and deceleration due to friction before overstress occurs. As heretofore stated, the slight eccentricity of the barrier ring 52 allows the rim 16 to contact the barrier ring at an initial single point, thus minimizing the possibility of locking up the entire rim of the rotor assembly 10, thus allowing the rotor to be slowed down without danger of overstressing the rotor. Additionally or as an option, inwardly extending thin ridges or high points of smaller ID on the barrier surface 54 may be used for early warning. Braking will occur in most cases without seizure or damage to the rotor or the surrounding hardware.

The casing clearance defined by the annulus 40 (dimension 60) must be selected to permit the barrier ring 52 to absorb energy in circumferential growth without loading the housing walls (38, 34 and 42) such that housing fracture and resulting unpredictable side loads could distort the energy absorption process and lead to a skewed release of rim fragments.

Figure 3:
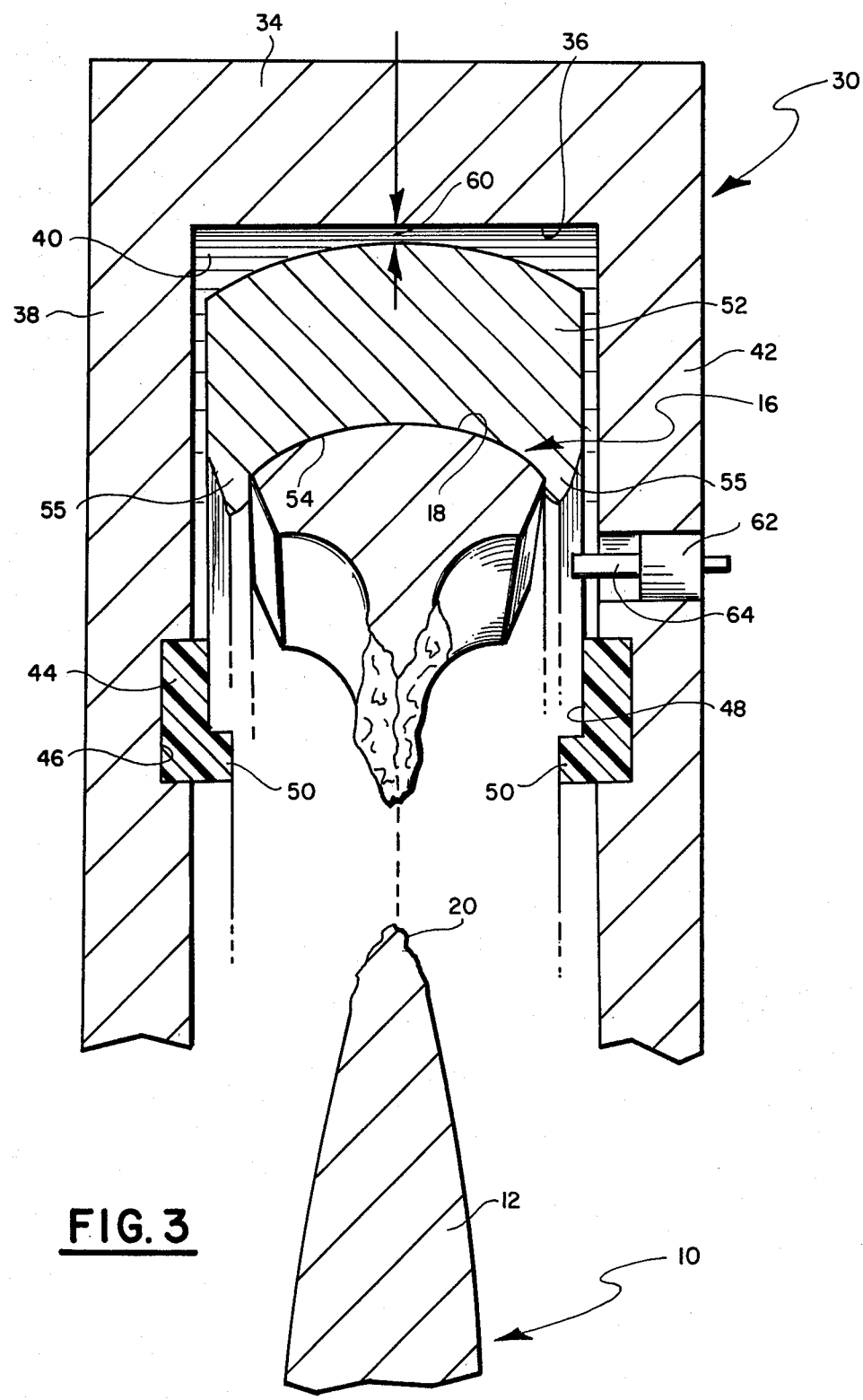
FIG. 3 is a partial cross section indicating the rim portion separated from the flywheel mass during a catastrophic overstress situation separating the rim from the disk.

Referring now to FIG. 3, it can readily be seen the means by which fragments are captured by the barrier ring 52. Rim fragment 16 is in full contact with surface 54 of barrier ring 52, the ridges 55 serving to retain the rim fragment 16 within the channel formed thereby. The annulus 40 formed by the outer housing 32 being large enough to absorb the energy released by the broken fragments of the rim impacting the barrier ring 52. This figure illustrates the integrity of the disk 12, thus preventing the massive catastrophic failure of the heavier disk portion 12 thereby allowing the barrier ring 52 to absorb the rim fragments separated at neck 20 from the disk 12.

Figure 4:
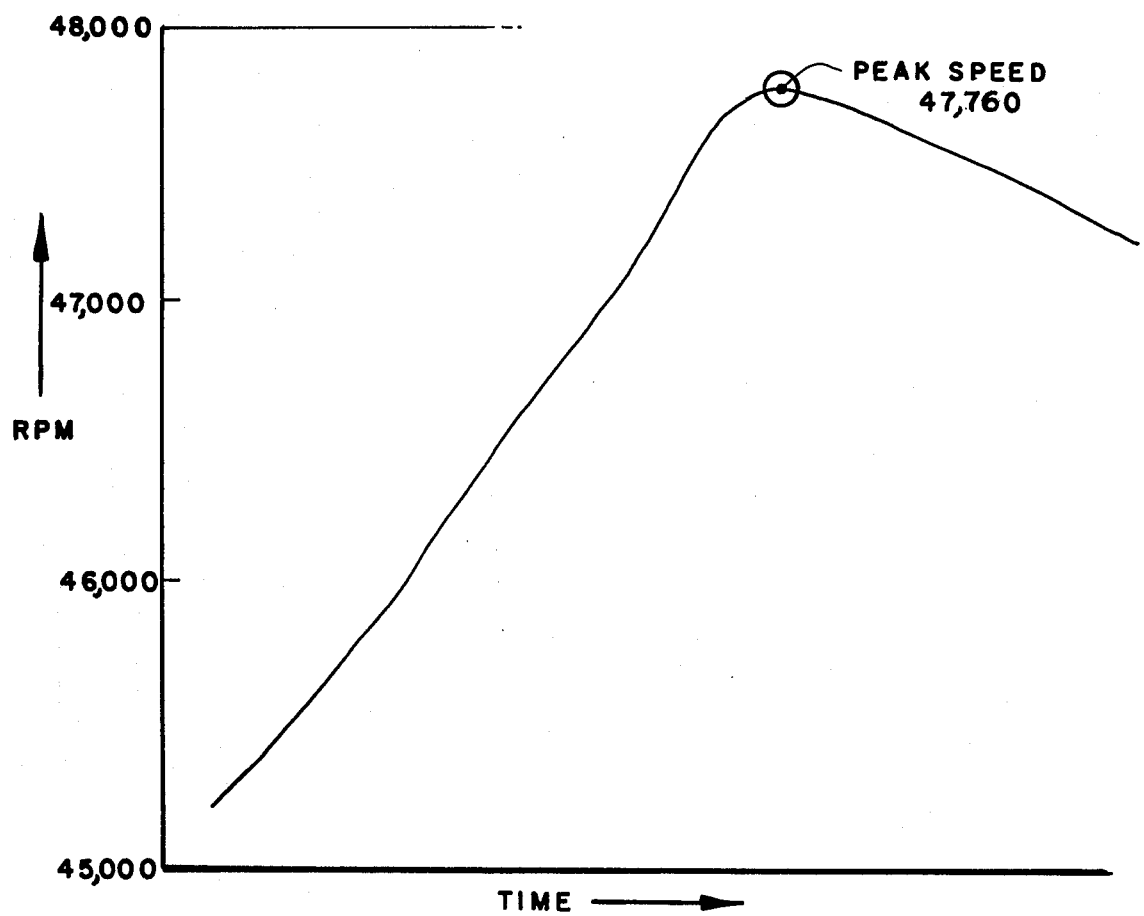
FIG. 4 is a chart illustrating a flywheel that is prevented from overspeed by the flywheel barrier system.

An experimental flywheel, for example, 14 inches in diameter weighing approximately 40 pounds and fabricated from the preferred HP9-4-30 material was deliberately tested to failure. The flywheel was designed for a rated speed of 39,750 RPM. Utilizing the capacitor detection system previously described, flywheel growth in the radial direction in amounts less than 0.001 inch were readily detected during rotor operation. In initial tests the wheel was accelerated rapidly to 47,760 RPM where radial growth resulted in barrier ring contact and automatic braking (as shown in FIG. 4) and there was no damage to either the wheel or the barrier ring. Subsequently, an oversized barrier ring was substituted to allow further speed increase and the same wheel was tested further. The wheel was spun to 49,800 RPM without permanent deformation, this speed being 24.5% over rated speed.

The wheel was spun to 50,520 RPM, reduced to 45,460 RPM, and returned to 51,520 RPM and reduced to 0 RPM without loss of wheel integrity.

During these cycles of overspeed, rotor plastic growth was clearly evident to the observer by monitoring a digital panel meter which displayed radius during the test as generated by the capacitive monitor. The wheel, during a planned overspeed to failure, failed in the neck portion 20 at 53,800 RPM (35.5% above the rated speed of 39,750 RPM). The disk portion remained intact separating only 10% of the wheel mass (rim 16).

Figure 5:
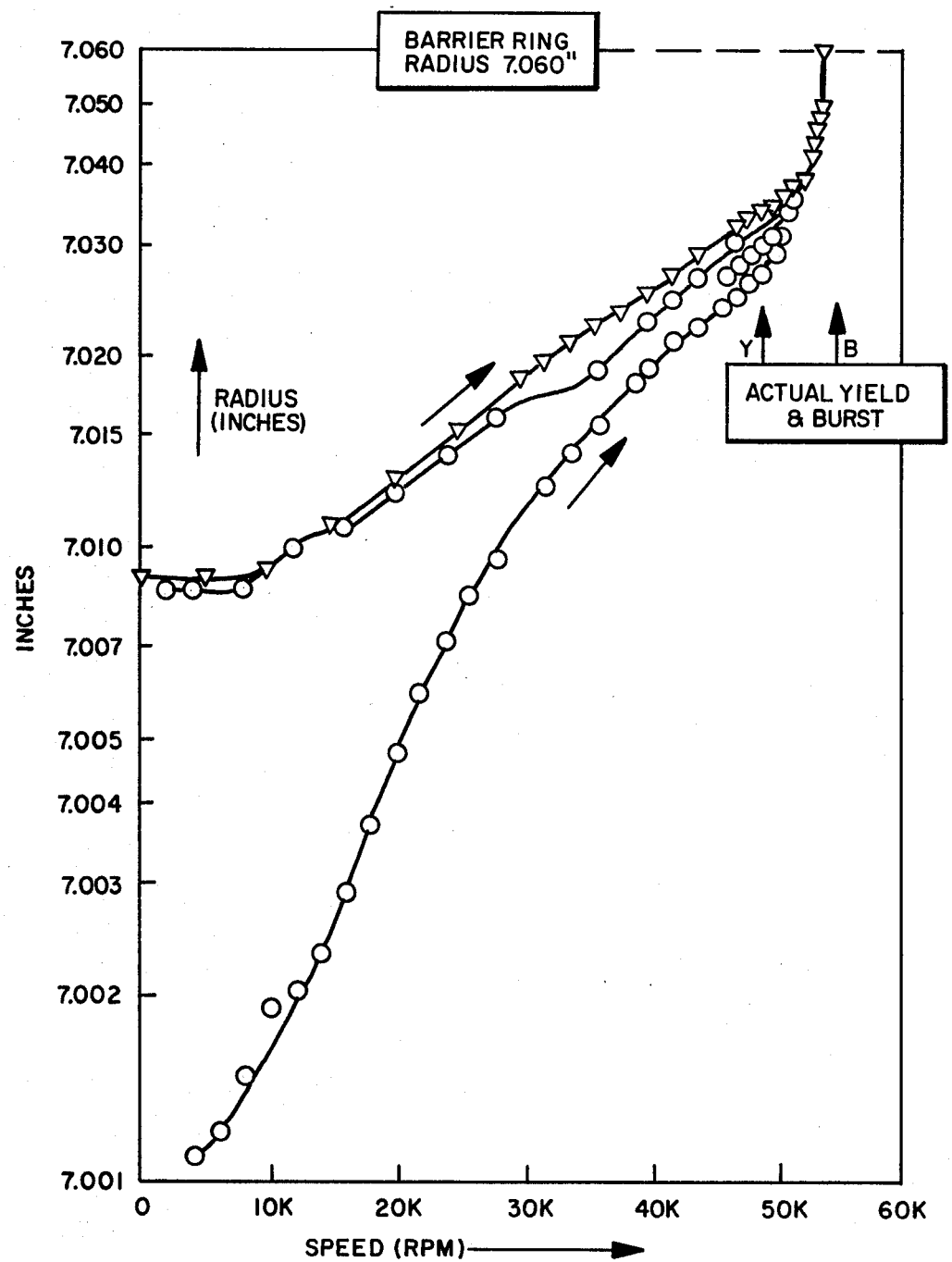
FIG. 5 is a chart illustrating a flywheel spun to intentional rim separation.

FIG. 5 illustrates the actual plastic growth of the 14 inches experimental wheel and the point where the rim 16 separated from the disk 12 utilizing the capacitor monitoring system. In this example, the barrier ring inside diameter is 7.060 inches and the flywheel diameter is 14.120 inches at 0 RPM.

It will, of course, be realized that various modifications can be made in the design and operation of the present invention without departing from the spirit thereof. Thus, while the principal preferred construction and mode of operation of the invention has been explained, and what is now considered to represent its best embodiment has been illustrated and described, it should be understood that within the scope of the appended claims, the invention may be practiced otherwise than as specifically illustrated and described.

I claim:
1. In a flywheel system wherein rotary motion is utilized as a source of energy, the improvement which comprises:
   a substantially metal flywheel having a disk portion and an integral rim portion, said disk portion being evenly stressed from its central portion radially outwardly towards a narrowed-down neck portion formed by said disk, said neck portion positioned between said disk and said integral rim portion is more highly stressed than said disk portion to facilitate separation of said rim portion from said disk portion in the event of flywheel overstress thereby maintaining the integrity of said disk portion,
   a substantially metal flywheel barrier housing concentrically positioned around said flywheel, said barrier housing being formed into a U-shaped trough, said trough having a first and second side perpendicular to the axis of said flywheel and a third end closure, said end being parallel with said axis, said first and second side partially overlapping at least the rim of said flywheel, said barrier further containing a substantially metal barrier ring surrounding said flywheel, said ring being slidable within said trough to absorb flywheel rim fragments in the event of rim separation from said flywheel, and
2. A non-conductive barrier ring guide positioned between said U-shaped trough and said metal barrier ring, said non-conductive ring guide serves to isolate said metal flywheel from said metal barrier ring, said flywheel being grounded acting as a first plate and said barrier ring acting as a second plate of a capacitive circuit, the gap formed by the outer surface of said rim and the inner wall formed by said barrier ring being sensed by said capacitive circuit by gap sensing means to detect radial growth of said flywheel when said flywheel is rotated.

* * * * *

UNITED STATES PATENT AND TRADEMARK OFFICE
CERTIFICATE OF CORRECTION

PATENT NO. : 4,111,067
DATED : September 5, 1978
INVENTOR(S) : Donald R. Hodson

It is certified that error appears in the above-identified patent and that said Letters Patent are hereby corrected as shown below:

Column 1, line 61, delete "patio" and insert --ratio--.

Column 6, line 27, delete "7.060" and insert --14.120--.
line 28, delete "14.120" and insert --14.002--.

Signed and Sealed this

Third Day of April 1979

[SEAL]

Attest:

RUTH C. MASON
Attesting Officer

DONALD W. BANNER
Commissioner of Patents and Trademarks